US009567976B2

(12) United States Patent
Chan et al.

(10) Patent No.: US 9,567,976 B2
(45) Date of Patent: Feb. 14, 2017

(54) WIND TURBINE CONTROL SYSTEM AND CONTROL METHOD THEREOF

(71) Applicant: DELTA ELECTRONICS, INC., Taoyuan County (TW)

(72) Inventors: Cheng-Chieh Chan, Taoyuan County (TW); Yi-Kuan Hsu, Taoyuan County (TW); Hsu-Fan Ai, Taoyuan County (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 509 days.

(21) Appl. No.: 14/161,367

(22) Filed: Jan. 22, 2014

(65) Prior Publication Data
US 2015/0078894 A1   Mar. 19, 2015

(30) Foreign Application Priority Data

Sep. 18, 2013   (TW) .............................. 102133782 A (51) Int. Cl.
*F03D 7/02*   (2006.01)
(52) U.S. Cl.
CPC ........... *F03D 7/0276* (2013.01); *F03D 7/0296* (2013.01); *Y02E 10/723* (2013.01)
(58) Field of Classification Search
CPC .............................. F03D 7/0276; F03D 7/0296
USPC ........................................................ 416/1
See application file for complete search history.

(56) References Cited

U.S. PATENT DOCUMENTS

2011/0241343 A1 *  10/2011  Petter ................... F03D 7/0256
290/44

FOREIGN PATENT DOCUMENTS

| CN | 102852841 A | 1/2013 | |
|---|---|---|---|
| CN | 202789469 U | 3/2013 | |
| CN | 103134140 A | 6/2013 | |
| TW | 200931242 A | 7/2009 | |
| TW | 201216022 A | 4/2012 | |
| TW | 1400439 B | 7/2013 | |
| TW | 201337113 A | 9/2013 | |
| WO | WO 2012146252 A2 * | 11/2012 | ........... F03D 7/0232 |

* cited by examiner

*Primary Examiner* — Nicholas J Weiss
*Assistant Examiner* — Jason T Newton
(74) *Attorney, Agent, or Firm* — Kirton McConkie; Evan R. Witt (57) ABSTRACT

A wind turbine control system includes a wind turbine, a power-converting device connected with the wind turbine, a control device and a human-machine interface. The control device is connected with the power-converting device. The control device includes a storage module having a first database, among which a first control data is stored in the first database. The human-machine interface having a GUI is connected with the control device. A second control data is set through the GUI and stored in the first database, such that the wind turbine is automatically controlled to rotate at a first rotational speed in a first time period and rotate at a second rotational speed in a second time period by the control device according to the first control data and the second control data. Therefore, the safety concerns are reduced, the operations are simplified, and the probable of inputting improper control parameters is eliminated.

8 Claims, 9 Drawing Sheets

WIND TURBINE CONTROL SYSTEM AND CONTROL METHOD THEREOF

TECHNICAL FIELD

The present disclosure relates to a wind turbine control system, and more particularly to a wind turbine control system with hardware and software interface and method integrated and a control method thereof.

BACKGROUND

With the improvement of technology, lot types of wind turbine system such as small wind power systems are widely used in general families for obtaining power through wind power.

In general, the rotational speed of a wind turbine of the small wind power system is varied with the wind speed of outer wind. The ratio of the rotational speed to the wind speed depends on the combination of the torque force of a power generator and the blades of the wind turbine, so that the rotational speeds of different designed wind turbines will not be the same. When the wind speed of outer wind is raised, the rotational speed of the wind turbine is also raised. However, the noise of the operation of the blades and the low-frequency vibration of the hub is too loud, and the environment is affected. In addition, compared with the solar power system, the outer wind is irregularly varied, which means that the noise of the wind turbine system is also irregularly generated. To solve this problem, the conventional wind turbine system is usually configured with a fan-stopping device.

The common fan-stopping devices can be classified into three types. The first one is a short circuit fan-stopping device used for making the three-phase circuit of the power generator of the wind turbine a short circuit. The second one is a physical break used for stopping the fan through mechanical means and elements. The third one is configured with a power converter for users to be manual operated as a short circuit. All the three types of the fan-stopping devices are manual operated by technicians, so that the technicians have to move close to the wind turbine to maintain or repair when the high-dB noise is generated. It exists some safety problems.

Figure 1:
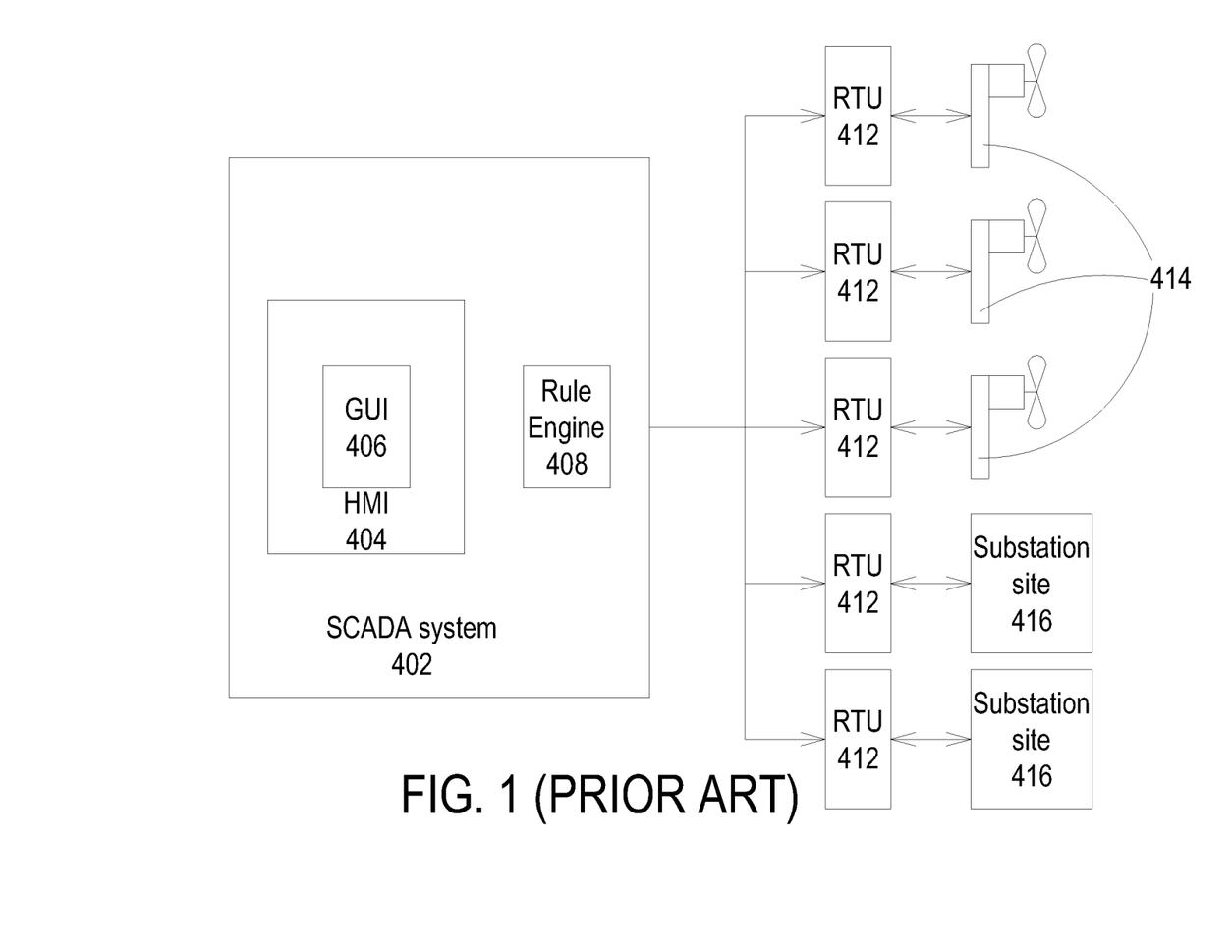
FIG. 1 schematically illustrates the system configuration of the conventional wind turbine control system.

An example of the conventional wind turbine control system is described in U.S. Pat. No. 8,433,425 B2. Please refer to FIG. 1. FIG. 1 schematically illustrates the system configuration of the conventional wind turbine control system. As shown in FIG. 1 and described in the prior art, the wind turbine control system is provided for users to input control rules, and a supervisory control and data acquisition system is provided as the computing input of a rule engine 408. In practical application, because the user is not familiar with the wind turbine control system, the rule establishment is incomplete, the construction time is too long to complete the control mechanism, and hence the safety concerns are arisen.

Moreover, the ambition of people to install the small wind power system is usually low due to the noise and the safety problem, and the cost of an automatic control system is too high to be applied in general families, so that the family used small wind power system is still manually stopped and maintained during emergency.

There is a need of providing a wind turbine control system and a control method thereof to avoid the dangers and obviate the drawbacks encountered from the prior art.

BRIEF SUMMARY

The present disclosure provides a wind turbine control system and a control method thereof in order to eliminate the drawbacks of the continuous noises, the inconvenient operations, the safety concerns of reducing the rotational speed of wind turbines and the probable of inputting improper control parameters.

The present disclosure also provides a wind turbine control system and a control method thereof. By utilizing a graphic user interface of a human-machine interface, a wind turbine can be set to automatically operate at lower rotational speed in a specified time period for reducing the generation of noises and complying the regulations. The safety concerns are reduced, the operations are simplified, and the probable of inputting improper control parameters is eliminated.

The present disclosure further provides a wind turbine control system and a control method thereof. Via the priority levels of the control data, the control data set by an advanced user is preferred to be employed, the energy loss and the cost waste caused by error operation are avoided, and the safety is enhanced.

In accordance with an aspect of the present disclosure, there is provided a wind turbine control system. The wind turbine control system includes at least a wind turbine, at least a power-converting device, a control device and a human-machine interface. The power-converting device is connected with the wind turbine. The control device is connected with the power-converting device. The control device includes a storage module having a first database, among which a first control data is stored in the first database. The human-machine interface having a graphic user interface is connected with the control device. A second control data is set through the graphic user interface of the human-machine interface and stored in the first database of the storage module, such that the wind turbine is automatically controlled to rotate at a first rotational speed in a first time period and rotate at a second rotational speed in a second time period by the control device according to the first control data and the second control data.

In accordance with another aspect of the present disclosure, there is provided a control method. The control method includes steps of providing at least a wind turbine, at least a power-converting device, a control device storing a first control data and a human-machine interface, connecting the power-converting device with the wind turbine and the control device, connecting the human-machine interface with the control device, and setting a second control data corresponding to a second time period through a graphic user interface of the human-machine interface and storing the second control data in the control device, such that the wind turbine is automatically controlled to rotate at a first rotational speed in a first time period and rotate at a second rotational speed in a second time period by the control device according to the first control data and the second control data.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
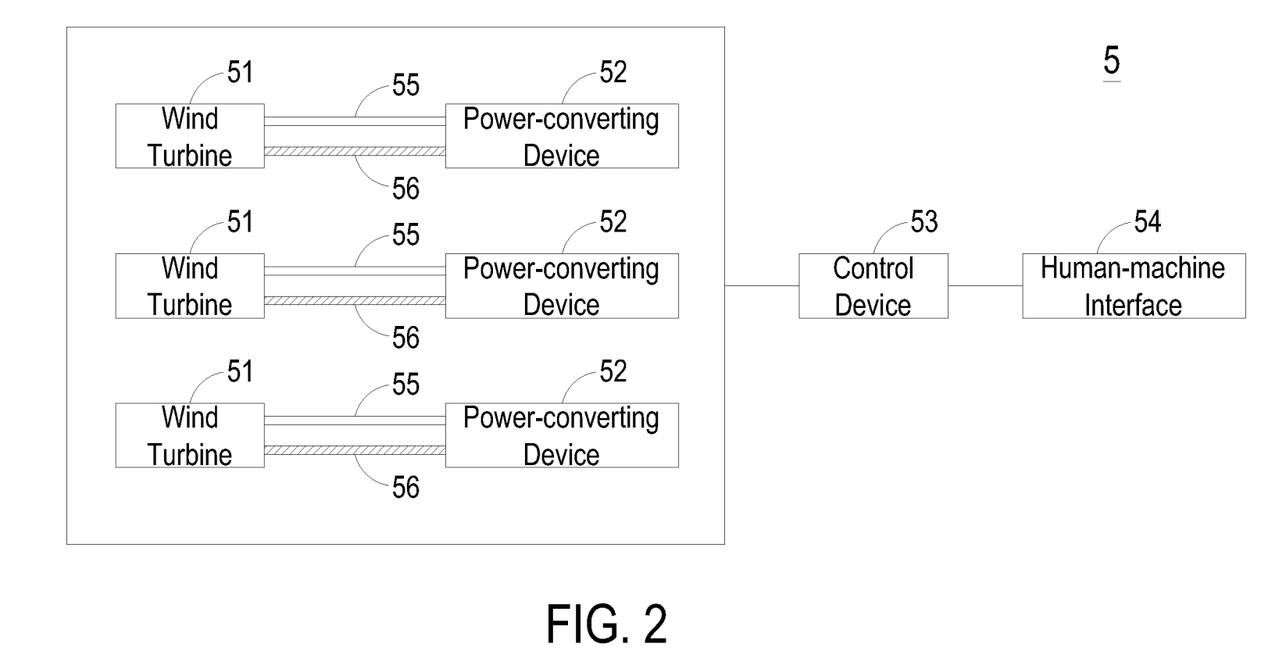
FIG. 2 schematically illustrates the configuration of a wind turbine control system according to an embodiment of the present disclosure.
Figure 3:
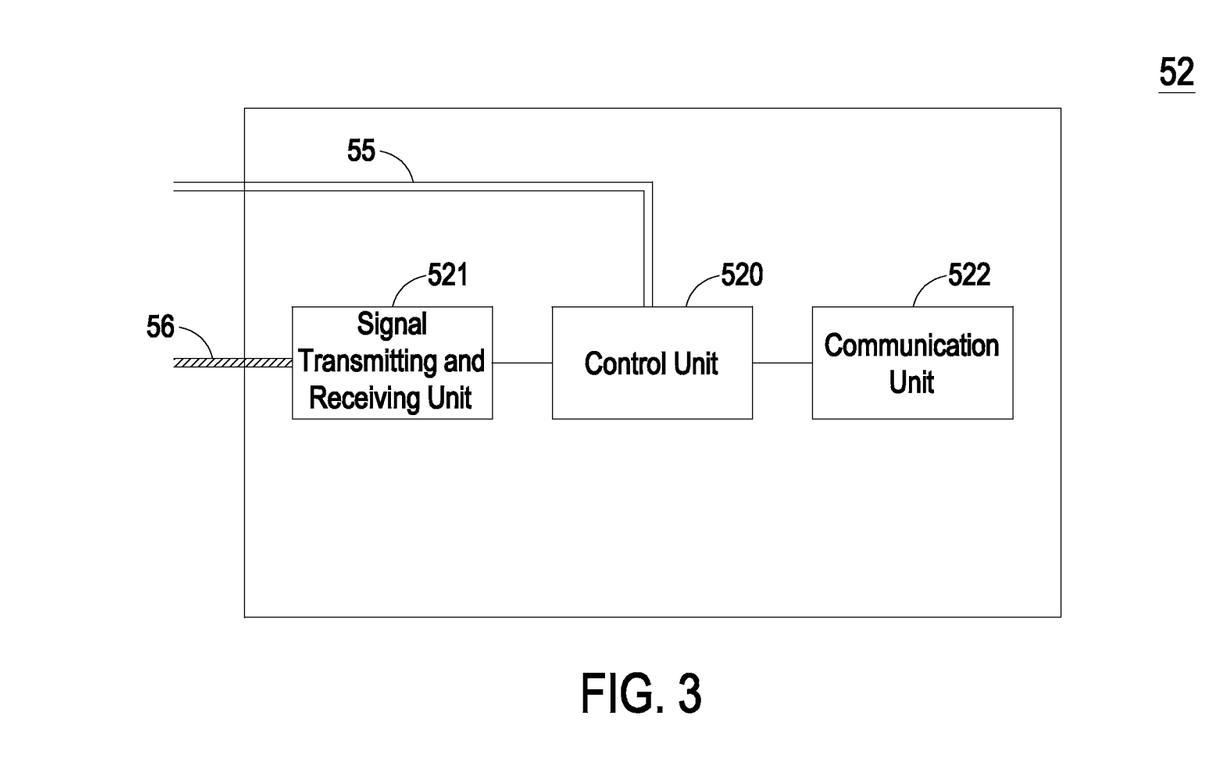
FIG. 3 schematically illustrates the configuration of a power-converting device according to an embodiment of the present disclosure.
Figure 4:
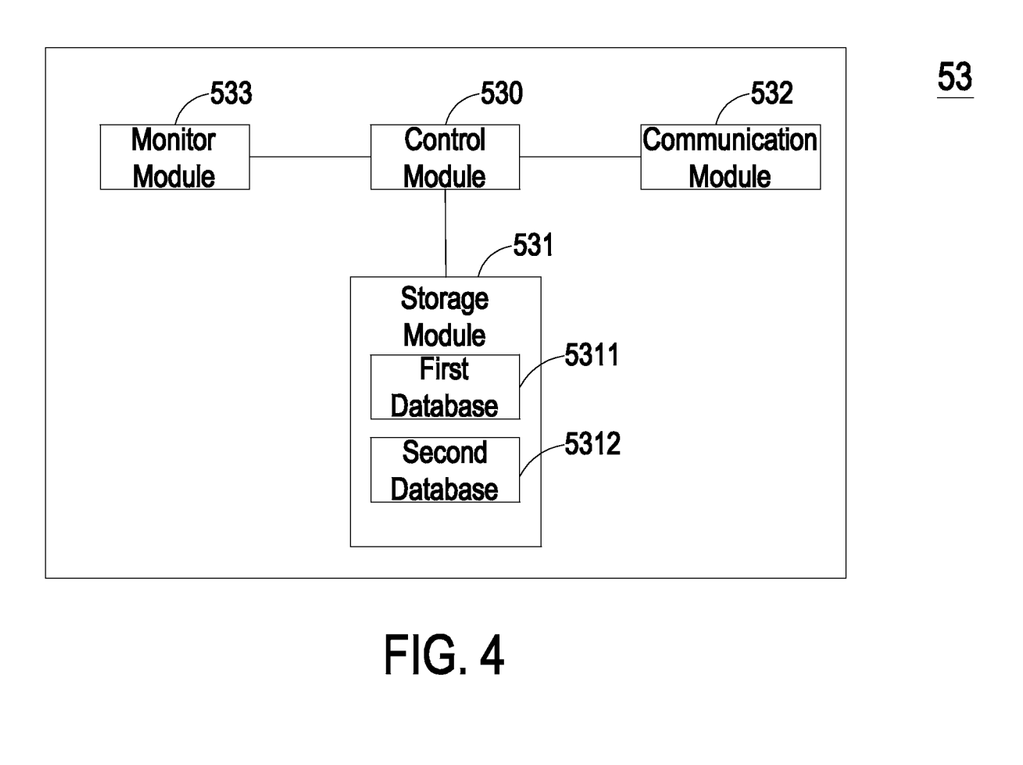
FIG. 4 schematically illustrates the configuration of a control device according to an embodiment of the present disclosure.

Please refer to FIG. 2, FIG. 3 and FIG. 4. FIG. 2 schematically illustrates the configuration of a wind turbine control system according to an embodiment of the present disclosure. FIG. 3 schematically illustrates the configuration of a power-converting device according to an embodiment of the present disclosure. FIG. 4 schematically illustrates the configuration of a control device according to an embodiment of the present disclosure. As shown in FIG. 2, FIG. 3 and FIG. 4, the wind turbine control system 5 according to an embodiment of the present invention can be applied to a photo catalyst system, a filter system, an air-condition system or an air exchange system. The wind turbine control system 5 includes at least a wind turbine 51, at least a power-converting device 52, a control device 53 and a human-machine interface 54. The power-converting device 52 is connected with the wind turbine 51, and the control device 53 is connected with the power-converting device 52. In other words, the power-converting device 52 is simultaneously connected with the wind turbine 51 and the control device 53. The control device 53 is for example a personal computer (PC), a combination of at least a microcontroller (MCU) and at least an electrically erasable programmable read-only memory (EEPROM) or a microprocessor mounted with any operation system. The control device includes a storage module 531 having a first database 5311, among which a first control data is stored in the first database 5311. The human-machine interface 54 is not limited to a monitor, a display, a television, a smart phone or a notebook PC. The human-machine interface 54 is connected with the control device 53, and the connection between the human-machine interface 54 and the control device 53 can be a wireless connection or a wired connection, but not limited thereto. The human-machine interface 54 has a graphic user interface (GUI). A second control data is set through the graphic user interface of the human-machine interface 54 and stored in the first database 5311 of the storage module 531 of the control device 53, such that the wind turbine 51 is automatically controlled to rotate at a first rotational speed in a first time period and rotate at a second rotational speed in a second time period by the control device 53 according to the first control data and the second control data. By utilizing the graphic user interface of the human-machine interface 54, the wind turbine 51 can be set to automatically operate at lower rotational speed in a specified time period for reducing the generation of noises and complying the regulations. The safety concerns are reduced, the operations are simplified, and the probable of inputting improper control parameters is eliminated.

In some embodiments, the power-converting device 52 is simultaneously connected with the wind turbine 51 through a three-phase power channel 55 and a signal channel 56, among which the amount of the power-converting device 52 is matched with the amount of the wind turbine 51. In other words, each the power-converting device 52 is corresponding to and connected with a wind turbine 51, but not limited thereto. The three-phase power channel 55 is a three-phase power source combined with a bridge rectifier, a three-phase power factor correction (PFC) circuit or a three-phase direct circuit (DC), and the signal channel 56 is a normal wire, a normal circuit or a serial communication wire (e.g. RS-485), but not limited thereto.

In addition, the power-converting device 52 includes a control unit 520, a signal transmitting and receiving unit 521 and a communication unit 522. The control unit 520 is configured to control the operation of the power-converting device 52. The signal transmitting and receiving unit 521 is connected with the control unit 520 and connected with the wind turbine 51 through the signal channel 56, and the communication unit 522 is connected with the control unit 520 and the control device 53. In this embodiment, the control unit 520 of the power-converting device 52 is connected with a power source such as a direct power source, an alternating power source or a mains electricity. The input power is converted by the control unit 520 of the power-converting device 52, and is then supplied to the wind turbine 51 through the three-phase power channel 55 by the control unit 520 of the power-converting device 52. The communication unit 522 is used for receiving a command signal outputted by the control device 53 when the wind turbine 51 is going to be controlled by the control device 53 to rotate at the first rotational speed in the first time period or rotate at the second rotational speed in the second time period according to the first control data and the second control data. The wind turbine 51 is controlled by the control unit 520 after the command signal outputted by the control device 53 is received by the communication unit 522. The wind turbine 51 rotated at the first rotational speed in the first time period or rotated at the second rotational speed in the second time period is implemented and controlled by the control unit 520.

In some embodiments, the control device 53 further includes a control module 530, a communication module 532 and a monitor module 533. The control module 530 is configured to control the operation of the control device 53 and connected with the storage module 531. The communication module 532 is connected with the control module 530 and the human-machine interface 54 for being remote controlled. An example of the connection between the communication module 532 and the human-machine interface 54 includes but not limited a mobile connection, an Ad-Hoc connection, a Bluetooth connection, a Zigbee connection, a Wi-Fi connection, an USB connection, an IEEE 1394 connection, a firewire connection or a thunderbolt connection. That is, the connection between the human-machine interface 54 and the communication module 532 of the present invention can be a wired connection or a wireless connection in local area network (LAN) or in wide are network (WAN), so that the communication module 532 of the control device 53 can be remote controlled.

Moreover, the monitor module 533 is connected with the control module 530 for monitoring and recording an operation data and an operation information of the power-converting device 52 and the wind turbine 51. In particular, the information transmitted by the power-converting device 52 is monitored and sensed by the monitor module 533 and stored in a second database 5312 of the storage module 531. The second database 5312 is preferably distinct from the first database 5311, but not limited thereto. The second database 5312 is used for storing the operation data and the operation information recorded by the monitor module 533 but not for storing any control data or setting data. Certainly, when the information transmitted by the power-converting device 52 is collected by the monitor module 533, the operation information of the wind turbine 51 is simultaneously collected by the monitor module 533, among which the value of the rotational speed of the wind turbine 51 collected by the monitor module 533 is compared with the specification of the wind turbine 51 and transformed back into a dB value of the operation volume of the wind turbine 51. The dB value is then stored in the second database 5312 of the storage module 531. That is, the monitor module 533 of the control device 53 is substantially used for monitoring, recording and collecting the operation data and the operation information of the power-converting device 52 and the wind turbine 51, such that the operation data and the operation information can be queried and inquired by users. The advanced user may adjust the operation parameters of the wind turbine 51 according to the operation data and the operation information.

In some embodiment, after the user sets the second control data corresponding to a specified time period through the graphic user interface of the human-machine interface 54, the control device 53 automatically controls the wind turbine 51 to rotate at a first rotational speed in a first time period and rotate at a second rotational speed in a second time period according to the first control data and the second control data. The actual values of the first rotational speed and the second rotational speed can be preset or advanced set by the advanced users (e.g. the installation personnel, the designer of wind turbine system, the designer of controller or the maintenance personnel). Therefore, the laws and the regulations such as a noise control law, a noise control guideline and the like formulated by Environmental Protection Agency or any other environment-protecting agencies are complied by the wind turbine 51 of the wind turbine control system 5. For example, the rotational speed of the wind turbine 51 is adjusted and controlled in order to comply the dB values, which are different in a first class control zone, a second class control zone, a third control zone or a fourth control zone at daytime and nighttime, limited by the laws or regulations.

Figure 5:
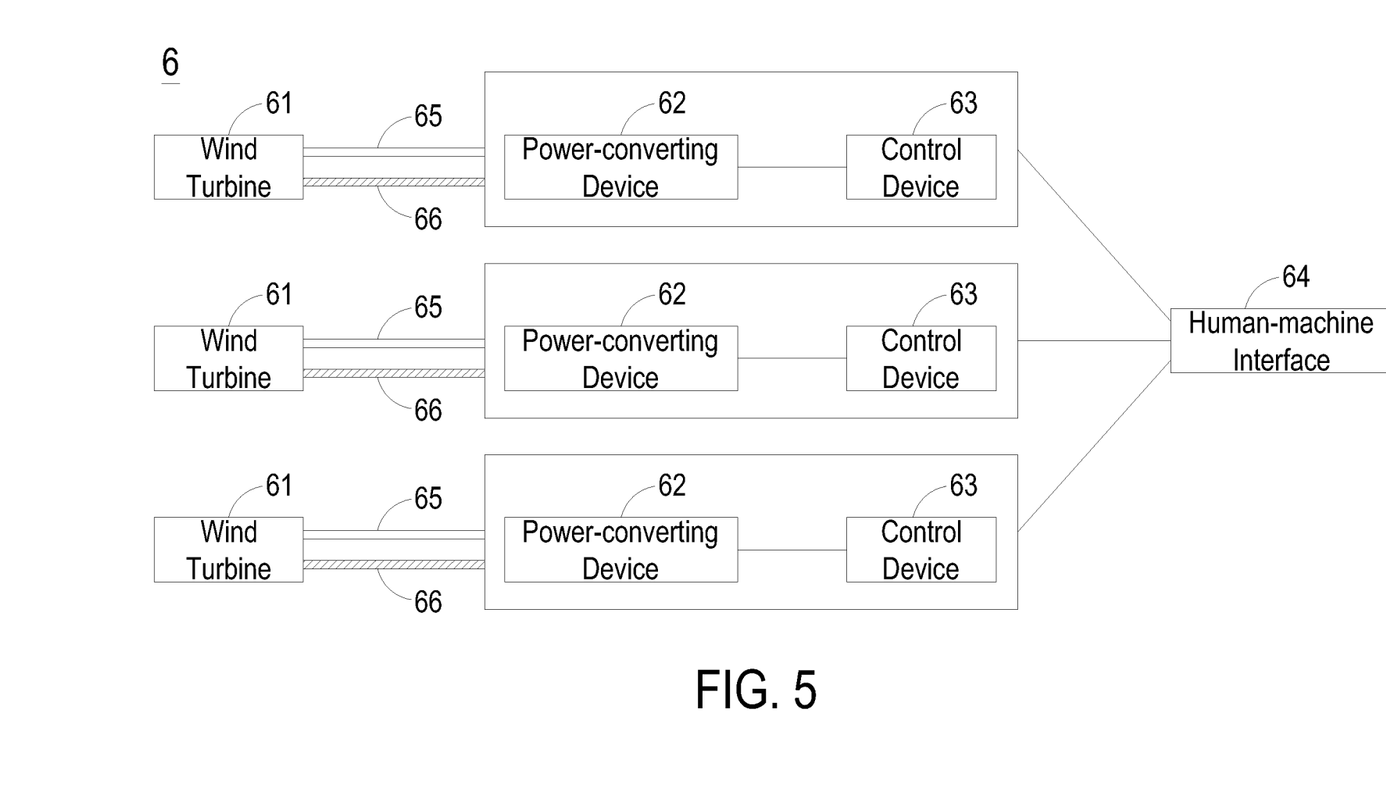
FIG. 5 schematically illustrates the configuration of a wind turbine control system according to another embodiment of the present disclosure.
Figure 6:
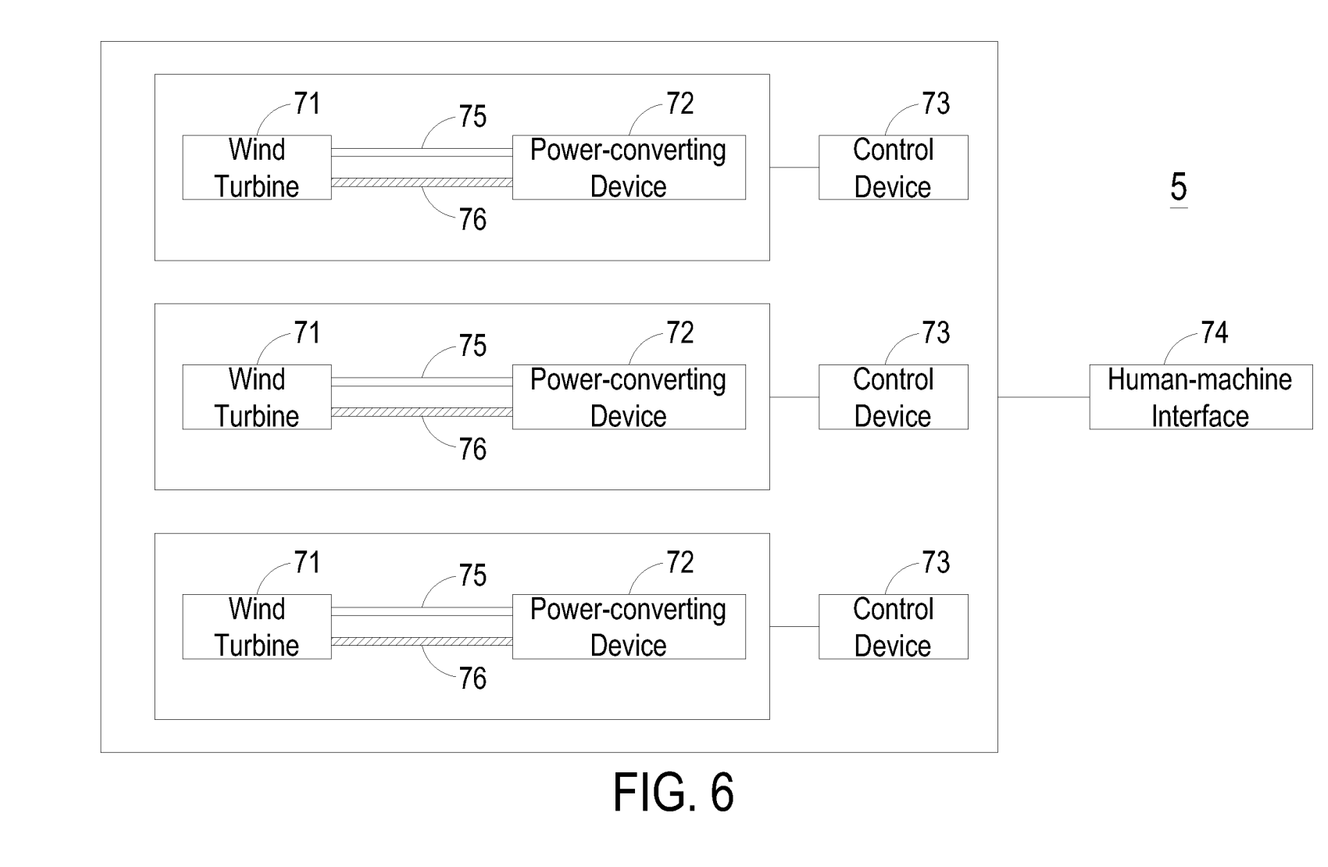
FIG. 6 schematically illustrates the configuration of a wind turbine control system according to still another embodiment of the present disclosure.

On the other hand, the wind turbine 51 and the power-converting device 52 can be not only integrated as a first integrated device, but also integrated as a second integrated device, integrated as a third integrated device, or isolated from each other. Please refer to FIG. 5 and FIG. 6. FIG. 5 schematically illustrates the configuration of a wind turbine control system according to another embodiment of the present disclosure. FIG. 6 schematically illustrates the configuration of a wind turbine control system according to still another embodiment of the present disclosure. As shown in FIG. 5 and FIG. 6, the wind turbine control system 6 according to another embodiment of the present invention can be applied to a photo catalyst system, a filter system, an air-condition system or an air exchange system. The wind turbine control system 6 includes at least a wind turbine 61, at least a power-converting device 62, a control device 63 and a human-machine interface 64. The wind turbine control system 7 according to still another embodiment of the present invention can also be applied to a photo catalyst system, a filter system, an air-condition system or an air exchange system. The wind turbine control system 7 includes at least a wind turbine 71, at least a power-converting device 72, a control device 73 and a human-machine interface 74. The wind turbine 61, the power-converting device 62, the control device 63 and the human-machine interface 64 and the wind turbine 71, the power-converting device 72, the control device 73 and the human-machine interface 74 are similar with the wind turbine 51, the power-converting device 52, the control device 53 and the human-machine interface 54 as described in above-mentioned embodiments, and are not redundantly described herein. It should be noted that the power-converting device 62 and the control device 63 are integrated as a second integrated device in the wind turbine control system 6, and the wind turbine 71, the power-converting device 72 and the control device 73 are integrated as a third integrated device in the wind turbine control system 7.

Figure 7:
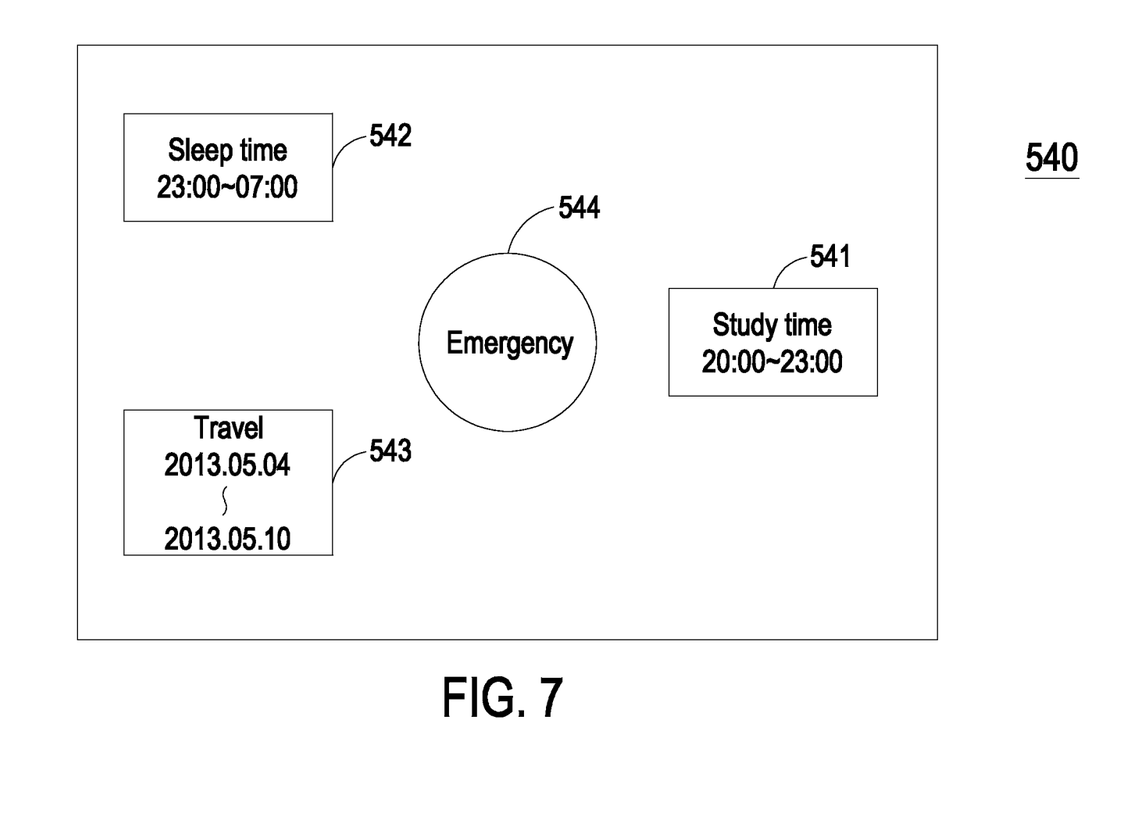
FIG. 7 schematically illustrates a graphic user interface of a human-machine interface according to an embodiment of the present disclosure.
Figure 8:
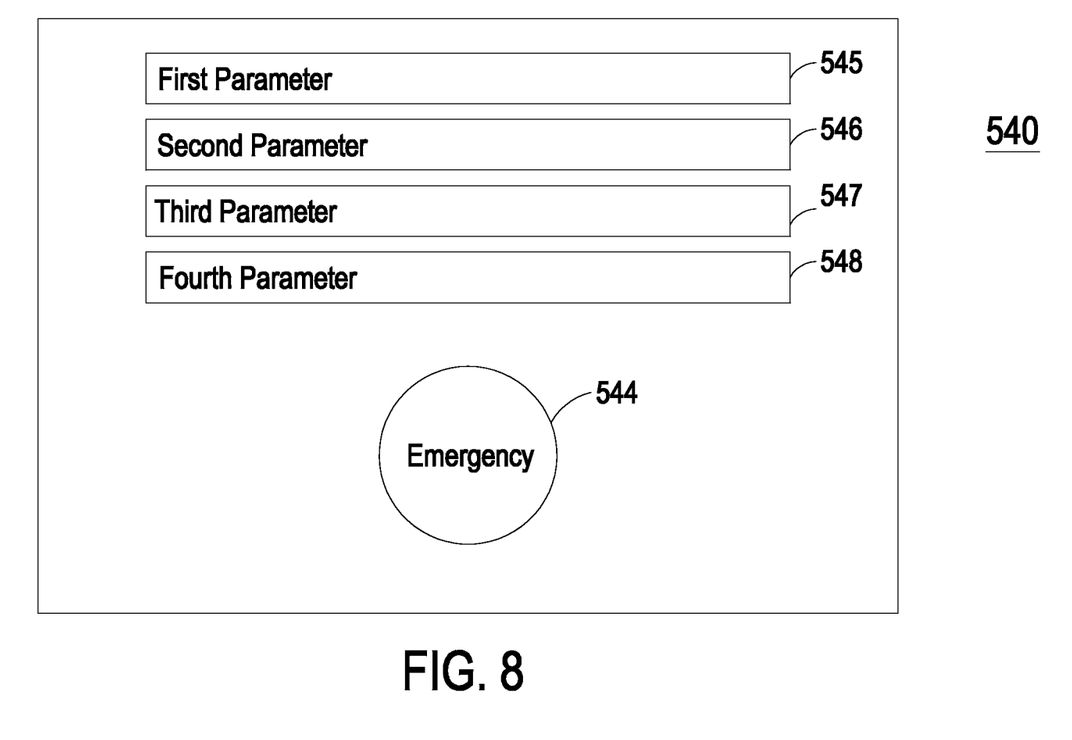
FIG. 8 schematically illustrates a graphic user interface of a human-machine interface according to another embodiment of the present disclosure.

Please refer to FIG. 2, FIG. 7 and FIG. 8. FIG. 7 schematically illustrates a graphic user interface of a human-machine interface according to an embodiment of the present disclosure. FIG. 8 schematically illustrates a graphic user interface of a human-machine interface according to another embodiment of the present disclosure. The graphic user interface 540 of the human-machine interface 54 of the wind turbine control system 5 is for example an application interface, a webpage interface, an interface programmed in Java language or an interface programmed in C# language, but not limited thereto. The information of the second control data can be displayed as a first virtual icon 541, and the start time and the end time of the second time period are directly displayed with the first virtual icon 541 in the preferred embodiments. Certainly, if the user set other control data corresponding to different time periods through the graphic user interface 540 of the human-machine interface 54 of the wind turbine control system 5, the other control data can be also displayed as a second virtual icon 542 or a third virtual icon 543, but not limited thereto.

In some embodiments, a high-level setting interface is provided with the graphic user interface 540 of the present invention. The first control data is directly set, modified or adjusted by an advanced user (e.g. an installation personnel, a designer of wind turbine system, a designer of controller or a maintenance personnel) through the high-level setting interface of the graphic user interface 540 and stored in the first database. Particularly, the further parameters such as the rotational speed and the current can also be set, modified or adjusted by the advanced user and displayed as a first parameter 545, a second parameter 546, a third parameter 547 or a fourth parameter 548. The first control data set by the advanced user has a first priority level, the second control data set by the normal user through a low-level setting interface of the graphic user interface 540 and stored in the first database 5311 as described in the embodiments mentioned above has a second priority level, and the first priority level is greater than the second priority level. In brief, when the settings of the second control data are conflicted with the settings of the first control data, the settings of the first control data will be taken as the standard operation settings by the wind turbine control system 5 of the present invention. In some embodiments, the first control data is corresponding to a third time period, the second control data is corresponding to a fourth time period, and the third time period and the fourth time period are at least partially overlapped as a fifth time period. Because the first priority level of the first control data is greater than the second priority level of the second control data, the settings of the first control data are taken as the standard operation settings in the fifth time period. In other words, the first time period is same as the third time period, and the second time period is same as the fourth time period excluding the fifth time period. As a result, via the priority levels of the control data, the control data set by an advanced user is preferred to be employed, the energy loss and the cost waste caused by error operation are avoided, and the safety is enhanced.

Furthermore, a virtual emergency stop icon 544 is displayed on both the high-level setting interface for the advanced users and the low-level setting interface for the normal users. Under this circumstance, an user may directly push, touch, press or trigger the emergency stop icon 544 to forcibly stop operating of the wind turbine 51 when a danger occurs or when the user want to manually stop the wind turbine 51.

Figure 9:
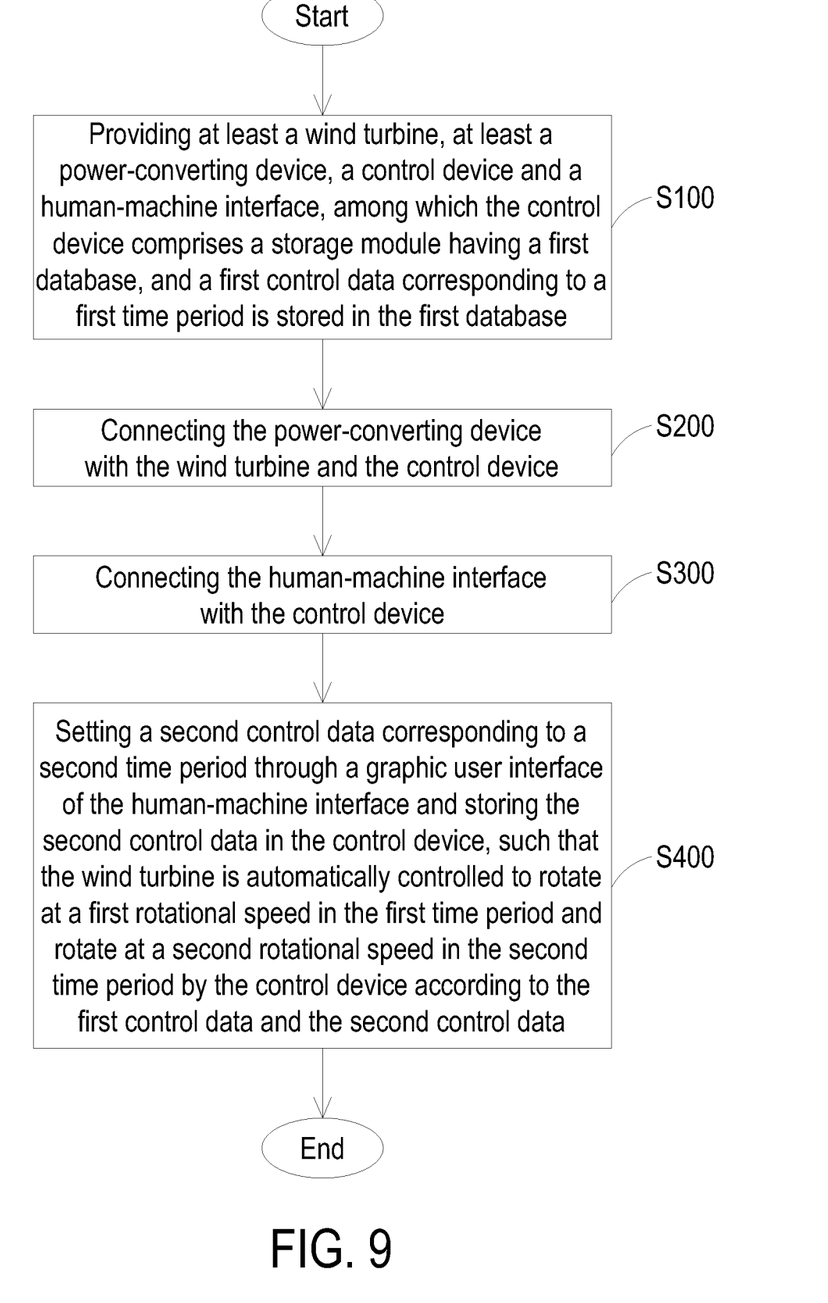
FIG. 9 schematically illustrates the flow chart of a control method according to an embodiment of the present disclosure.

Please refer to FIG. 2 and FIG. 9. FIG. 9 schematically illustrates the flow chart of a control method according to an embodiment of the present disclosure. The control method according to an embodiment of the present invention includes steps as follows. First, the flow of the control method begins at step S100, providing at least a wind turbine 51, at least a power-converting device 52, a control device 53 and a human-machine interface 54, among which a first control data is stored in the control device 53. Next, as shown in step S200, connecting the power-converting device 52 with the wind turbine 51 and the control device 53, among which the power-converting device 52 is connected with the wind turbine 51 through a three-phase power channel 55 and a signal channel 56. Then, connecting the human-machine interface 54 with the control device 53 as shown in step S300. The control device 53 is remote controlled by the human-machine interface 54 through a wired connection or a wireless connection in a local area network or in a wide area network. Next, as shown in step S400, setting a second control data corresponding to a second time period through a graphic user interface of the human-machine interface 54 and storing the second control data in the control device 53, such that the wind turbine 51 is automatically controlled to rotate at a first rotational speed in a first time period and rotate at a second rotational speed in a second time period by the control device 53 according to the first control data and the second control data.

From the above description, the present disclosure provides a wind turbine control system and a control method thereof. By utilizing a graphic user interface of a human-machine interface, a wind turbine can be set to automatically operate at lower rotational speed in a specified time period for reducing the generation of noises and complying the regulations. The safety concerns are reduced, the operations are simplified, and the probable of inputting improper control parameters is eliminated. Meanwhile, via the priority levels of the control data, the control data set by an advanced user is preferred to be employed, the energy loss and the cost waste caused by error operation are avoided, and the safety is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wind turbine control system, comprising:
at least a wind turbine;
at least a power converter connected with said wind turbine, wherein said power converter comprises a control unit configured to control the operation of said power converter;
a control device connected with said power converter, wherein said control device comprises a storage module having a database, and a first control data is stored in said database; and
a human-machine interface connected with said control device, wherein said human-machine interface includes a graphic user interface,
wherein a second control data is set through said graphic user interface of said human-machine interface and stored in said database of said storage module, such that said wind turbine is automatically controlled to rotate at a first rotational speed in a first time period and rotate at a second rotational speed in a second time period by said control unit of said power converter according to said first control data and said second control data of said control device,
wherein said first control data has a first priority level, said second control data has a second priority level, and said first priority level is greater than said second priority level, and
wherein said first control data is corresponding to a third time period, said second control data is corresponding to a fourth time period, and said third time period and said fourth time period are at least partially overlapped as a fifth time period, and wherein said first time period is same as said third time period, and said second time period is same as said fourth time period excluding said fifth time period.

2. The wind turbine control system according to claim 1, wherein said power converter is connected with said wind turbine through a three-phase power channel and a signal channel.

3. The wind turbine control system according to claim 2, wherein said power converter further comprises:
a signal transmitting and receiving unit connected with said control unit and said wind turbine, wherein said signal transmitting and receiving unit is connected with said wind turbine through said signal channel; and
a communication unit connected with said control unit and said control device for receiving a command signal outputted by said control device, such that said wind turbine rotated at said first rotational speed in said first time period or rotated at said second rotational speed in said second time period is implemented by said control unit.

4. The wind turbine control system according to claim 1, wherein said control device further comprises:

a control module configured to control the operation of said control device and connected with said storage module;

a communication module connected with said control module and said human-machine interface for being remote controlled; and a monitor module connected with said control module for monitoring and recording an operation data and an operation information of said power converter and said wind turbine.

5. The wind turbine control system according to claim 4, wherein said storage module further has another database for storing said operation data and said operation information recorded by said monitor module.

6. The wind turbine control system according to claim 1, wherein the amount of said power converter is matched with the amount of said wind turbine.

7. The wind turbine control system according to claim 1, wherein said first control data is set by an advanced user through a high-level setting interface of said graphic user interface and stored in said database, and said second control data is set by a normal user through a low-level setting interface of said graphic user interface and stored in said database.

8. A control method, comprising steps of:

providing at least a wind turbine, at least a power converter, a control device and a human-machine interface, wherein said power converter comprises a control unit configured to control the operation of said power converter, and a first control data is stored in said control device;

connecting said power converter with said wind turbine and said control device;

connecting said human-machine interface with said control device; and setting a second control data corresponding to a second time period through a graphic user interface of said human-machine interface and storing said second control data in said control device, such that said wind turbine is automatically controlled to rotate at a first rotational speed in a first time period and rotate at a second rotational speed in a second time period by said control unit of said power converter according to said first control data and said second control data of said control device, wherein said first control data has a first priority level, said second control data has a second priority level, and said first priority level is greater than said second priority level, and wherein said first control data is corresponding to a third time period, said second control data is corresponding to a fourth time period, and said third time period and said fourth time period are at least partially overlapped as a fifth time period, and wherein said first time period is same as said third time period, and said second time period is same as said fourth time period excluding said fifth time period.

* * * * *